United States Patent Office 3,725,227
Patented Apr. 3, 1973

3,725,227
PROCESS FOR THE MANUFACTURE OF 2-CHLOR-ETHANEPHOSPHONIC ACID DICHLORIDE
Hans-Jerg Kleiner, Bad Soden, Taunus, Germany, assignor to Farbwerke Hoechst Aktiengesellschaft vormals Meister Lucius & Bruning, Frankfurt am Main, Germany
No Drawing. Filed Mar. 26, 1971, Ser. No. 128,537
Claims priority, application Germany, Mar. 28, 1970, P 20 15 163.7
Int. Cl. B01j 1/10; C07f 9/42
U.S. Cl. 204—158 HA    10 Claims

ABSTRACT OF THE DISCLOSURE

Preparation of 2-chlorethanephosphonic acid dichloride by the reaction of ethanephosphonic acid dichloride with a chlorinating agent.

---

The present invention relates to a process for the manufacture of 2-chlorethanephosphonic acid dichloride.

It has been proposed to produce 2-chlorethanephosphonic acid dichloride by reaction of 2-chlorethanephosphonic acid-bis-(β-chlorethyl ester) with phosphorus pentachloride [cf. Chem. Abstr. 42, 7241–7243 (1948) and Chem. Abstr. 48, 564 (1954)]. In this case, the starting material can only be obtained in a complicated manner from phosphorus trichloride and ethylene oxide via tris-(2-chlorethyl)-phosphite by subsequent isomerization at a reaction temperature which must be carefully observed. Moreover, undesirable polymeric by-products are formed. It has also been proposed to produce 2-chlorethanephosphonic acid dichloride by a technically complicated process which involves reacting ethylene with oxygen and phosphorus trichloride, whereby only moderate yields are obtained [cf. Houben-Weyl, Methoden der organischen Chemie, volume 12/1, pages 389, 401 and 443, Stuttgart (1964)].

The present invention provides a process for the manufacture of 2-chlorethanephosphonic acid dichloride of the formula

which comprises reacting ethanephosphonic acid dichloride of the formula

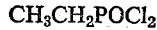

with a chlorinating agent.

Ethanephosphonic acid dichloride is easily accessible in industry and can be obtained, for example, from triethyl phosphite by isomerization to ethanephosphonic acid diethyl ester and subsequent reaction with phosphorus pentachloride.

As a chlorinating agent, elementary chlorine or sulfuryl chloride, dichloromonoxide, disulfurdichloride, thionyl chloride or nitrosyl chloride may be used. The chlorination may generally be carried out at temperatures within the range from −20° to +250° C. The reaction may be activated by free radical forming substances or by irradiation with light, preferably ultraviolet light.

As the chlorinating agent, elementary chlorine in advantageously used at temperatures within the range from 0° to 250° C. In the absence of an activating agent, the chlorination is advantageously carried out at a temperature within the range from 100° to 250° C., preferably 120° to 170° C. When using an activating agent, the chlorination is advantageously performed at temperatures within the range from 0 to 120° C., preferably 50° to 90° C.

The activation may be brought about by free radical forming substances, for example peroxides, e.g. benzoyl peroxide, triacetone peroxide, lauroyl peroxide, acetylcyclohexanesulfonyl peroxide, or by azoisobutyronitrile or lead tetraethyl. Alternatively, it may be brought about by light rays, preferably rays of ultraviolet light. The radiation source may be inside or outside the reaction vessel. When the radiation source is outside the reaction vessel, the latter must be of glass. Elementary chlorine may also be activated by previous irradiation, for example, with a mercury vapor lamp.

The chlorinating agents mentioned besides elementary chlorine are advantageously used in the presence of peroxides.

The chlorination is suitably carried out in the absence of atmospheric oxygen. For this purpose, the reaction vessel is filled with an inert gas, for example nitrogen or argon, before the chlorination.

The chlorination may be carried out in the presence of an appropriate solvent, for example, methylene chloride, chloroform, carbon tetrachloride, benzene, chlorobenzene, dichlorobenzene or carbon disulfide. Other suitable reaction media are phosphorus oxychloride and phosphorus trichloride.

It is surprising that in the chlorination of the invention 2-chlorethanephosphonic acid dichloride is predominantly obtained while 1-chlorethanephosphonic acid dichloride is formed to a minor extent only. The formation of higher chlorinated ethanephosphonic acid dichlorides as by-products is likewise insignificant.

When the chlorination is only carried out to a degree of chlorination of 10 to 20%, 2-chlorethanephosphonic acid dichloride is formed almost exclusively. Even with a degree of chlorination of 50 to 70%, the chlorinated ethanephosphonic acid dichloride consists of 70 to 80% of 2-chlorethanephosphonic acid dichloride. In addition thereto, small amounts of 1-chlorethanephosphonic acid dichloride and higher chlorinated ethanephosphonic acid dichlorides, particular 2,2-dichloroethanephosphonic acid dichloride, are formed.

It is therefore preferable to discontinue the chlorination when a degree of chlorination of 50 to 70% is attained.

When the chlorination is terminated, unreacted ethanephosphonic acid dichloride is removed from the reaction mixture by distillation and may be returned to the chlorination reaction. The crude reaction product remaining behind predominantly contains 2-chloroethanephosphonic acid dichloride. By fractional distillation, 2-chloroethanephosphonic acid dichloride of about 90% purity can be obtained and may be subjected without further purification to subsequent reactions, especially if the products formed therefrom can be separated in a simpler manner than the starting materials. The physical data and chemical reactivity of 2-chloroethanephosphonic acid derivatives differ considerably from those of 1-chlorethanephosphonic acid derivatives.

The 2-chlorethanephosphonic acid dichloride can also be separated from the reaction mixture in a substantially pure form by careful fractional distillation.

The process of the invention may also be carried out continuously.

2-chlorethanephosphonic acid dichloride is an important intermediate product. It may be used for the manufacture of 2-chlorethanephosphonic acid which has a growth-promoting action on plants. Esters and amides of 2-chlorethanephosphonic acid may be used as plant protection products. It is also possible to convert 2-chlorethanephosphonic acid dichloride into vinylphosphonic acid dichloride which is used for the manufacture of plastics.

The process of the invention enables 2-chlorethanephosphonic acid dichloride, which could hitherto be obtained only under difficult conditions, to be produced from easily accessible starting compounds by a simple chlorinating reaction.

The following examples serve to illustrate the invention.

EXAMPLE 1

In a four-necked glass flask provided with gas inlet pipe, stirring means and thermometer, 90 grams of chlorine dried with concentrated sulfuric acid were added, while stirring, to 400 grams of ethanephosphonic acid dichloride at 70° to 90° C. in the course of 75 minutes, while irradiating with ultraviolet light emitted by a lamp outside the glass flask. The reaction mixture was then distilled on a column. After an excess of 190 grams of ethanephosphonic acid dichloride had been distilled off in a first fraction, a second fraction of 47.5 grams was obtained which contained 80% of 1-chlorethanephosphonic acid dichloride and distilled between 35° and 57° C., at 0.8 mm. Hg. A third fraction of 167 grams of 2-chlorethanephosphonic acid dichloride was subsequently obtained at 59° C./0.8 mm. Hg. A fourth fraction of 12 grams of higher chlorinated ethanephosphonic acid dichlorides could be obtained at 75° C./0.8 mm. Hg. The distillation residue was 6 grams.

By carrying out the reaction in this manner, a total degree of chlorination of about 50% was obtained. The total of chlorinated ethanephosphonic acid dichloride contained about 75% of 2-chlorethanephosphonic acid dichloride.

The composition of the fractions was determined by NMR (nuclear magnetic resonance) spectra and quantitative analysis of the chlorine content.

EXAMPLE 2

In the course of 2½ hours 100 grams of chlorine dried with concentrated sulfuric acid were introduced at 80° C. into 300 grams of ethanephosphonic acid dichloride while stirring vigorously and irradiating the reaction mixture with the help of an immersed ultraviolet lamp. The reaction mixture was then distilled on a column. 149 grams of a first fraction were obtained at 35° to 55° C./1.3 mm. Hg, then 9 grams of an intermediate fraction and subsequently a second fraction of 155 grams at 60° to 70° C. The distillation residue was 9 grams.

The first fraction contained 78 mol percent of starting material, 12 mol percent of 2-chlorethanephosphonic acid dichloride and 10 mol percent 1-chlorethanephosphonic acid dichloride. The second fraction contained 87 mol percent of 2-chlorethanephosphonic acid dichloride, 5 mol percent of 1-chlorethanephosphonic acid dichloride and 8 mol percent of 2,2-dichlorethanephosphonic acid dichloride.

By carrying out the reaction in this manner, a degree of chlorination of about 65% was obtained. The chlorinated ethanephosphonic acid dichloride contained about 75% of 2-chlorethanephosphonic acid dichloride which could be obtained in a substantially pure form by subsequent fractional distillation.

EXAMPLE 3

After rinsing the reaction vessel with pure nitrogen, 275 grams of ethanephosphonic acid dichloride were heated under reflux with 178 grams of sulfuryl chloride and 1 gram of dibenzoyl peroxide in a manner such that the internal temperature had risen to 115° C. after 90 minutes. By subsequent column-distillation, 145 grams of a first fraction were obtained at 35° to 45° C./1.7 mm. Hg, then 13 grams of a second fraction at 45° to 60° C. and finally 57 grams of a third fraction at 60° to 70° C. The distillation residue was 27 grams. The first fraction contained 93 mol percent of starting product and 7 mol percent of 1-chlorethanephosphonic acid dichloride. The second fraction contained 45 mol percent of starting product, 42 mol percent of 1-chlorethanephosphonic acid dichloride and 13 mol percent of 2-chlorethanephosphonic acid dichloride. The third fraction contained 3 mol percent of starting product, 8 mol percent of 1-chlorethanephosphonic acid dichloride, 81 mol percent of 2-chlorethanephosphonic acid dichloride and 8 mole percent of 2,2-dichlorethanephosphonic acid dichloride. The chlorinated ethanephosphonic acid dichloride contained 70% of 2-chlorethanephosphonic acid dichloride.

By carrying out the reaction in this manner, a degree of chlorination of about 45% was obtained.

What is claimed is:

1. A process for the selective manufacture of 2-chlorethanephosphonic acid dichloride of the formula $$ClCH_2CH_2POCl_2$$

which comprises reacting a stoichiometric excess of ethanephosphonic acid dichloride of the formula $$CH_3CH_2POCl_2$$

at a temperature from −20° C. to 250° C. with a chlorinating agent to a degree of chlorination of the starting material up to 70%.

2. The process of claim 1 wherein the chlorinating agent is elementary chlorine.

3. The process of claim 1 wherein the chlorinating agent is sulfuryl chloride.

4. The process of claim 1 wherein the reagents are irradiated with light.

5. The process of claim 1 wherein a free radical-forming substance is additionally present.

6. The process of claim 5 wherein the free radical forming substance is benzoyl peroxide.

7. The process of claim 1 wherein the reaction is carried out in the presence of an inert solvent.

8. The process of claim 1 wherein the reaction is carried out with the exclusion from atmospheric oxygen.

9. The process of claim 1 wherein the reaction is discontinued when a degree of chlorination of 50 to 70% has been attained.

10. The process of claim 1 wherein the reagents are irradiated with ultra-violet light.

References Cited

UNITED STATES PATENTS 2,834,804  5/1958  Lecher et al. _____ 204—158 HA
2,882,310  4/1959  Copenhaver et al. __ 260—543 P HOWARD S. WILLIAMS, Primary Examiner U.S. Cl. X.R.

260—543 P